United States Patent [19]

Mayumi et al.

[11] Patent Number: 4,478,899

[45] Date of Patent: Oct. 23, 1984

[54] SEAT CORE MEMBERS OR PARTITION PLATES FOR VEHICLES FORMED FROM SYNTHETIC RESIN

[75] Inventors: Yoshishige Mayumi; Kenzoh Satoh, both of Yokohama; Kenji Hasegawa, Tokyo; Mitsuyoshi Takahashi, Kitakata, all of Japan

[73] Assignee: Showa Denko Kabushiki Kaisha, Tokyo, Japan

[21] Appl. No.: 466,223

[22] Filed: Feb. 14, 1983

Related U.S. Application Data

[63] Continuation of Ser. No. 236,495, Feb. 20, 1981, abandoned.

[30] Foreign Application Priority Data

Feb. 27, 1980 [JP] Japan ............................ 55-23746

[51] Int. Cl.³ .................... B32B 3/12; A47C 7/02
[52] U.S. Cl. ................................. 428/72; 296/63; 428/76; 428/167; 428/172; 428/178
[58] Field of Search ............... 428/72, 76, 116, 167, 428/172, 178, 119, 120, 188; 296/63, 66; 297/DIG. 2

[56] References Cited

U.S. PATENT DOCUMENTS

| 3,270,393 | 9/1966 | Levenson | 297/DIG. 2 |
| 3,821,051 | 6/1974 | Withers | 428/167 |
| 4,130,682 | 12/1978 | Lauko | 428/116 |
| 4,142,757 | 3/1979 | Fogle et al. | 297/DIG. 2 |
| 4,246,734 | 1/1981 | Fogle et al. | 296/66 |

FOREIGN PATENT DOCUMENTS 2078628 1/1982 United Kingdom .................. 428/72

Primary Examiner—Paul J. Thibodeau
Attorney, Agent, or Firm—Robert T. Gammons

[57] ABSTRACT

The present invention relates to the construction of a core member or a partition plate and method for manufacturing the same by use of blow molding means, wherein a hollow plate member formed of a synthetic resin is used for a seat core member and a partition plate for vehicles such as automobiles, the decrease in strength resulting from the hollow structure is prevented by reinforcing members molded at the same time when the body composed of a plate member is blow molded, the core member or the partition plate being strengthened by the body and the reinforcing members within the body.

6 Claims, 16 Drawing Figures

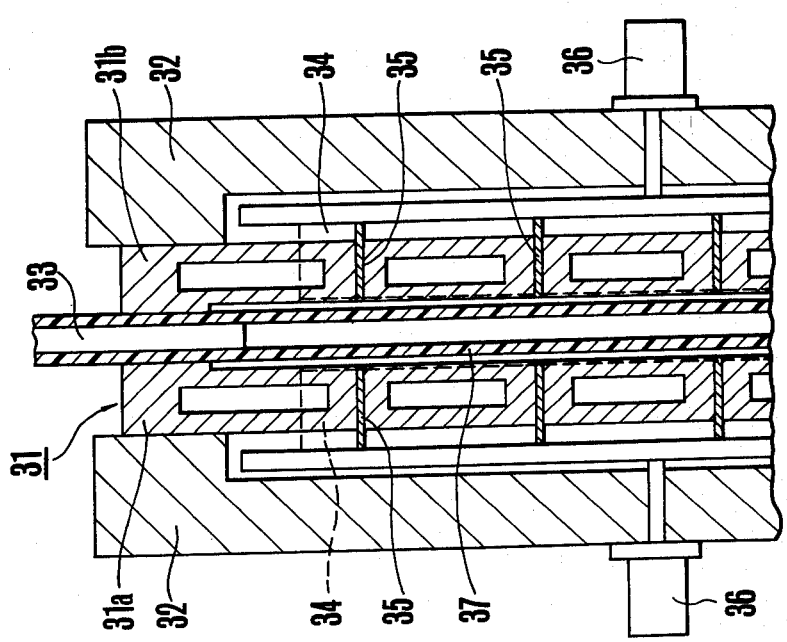
FIG.8(III)

SEAT CORE MEMBERS OR PARTITION PLATES FOR VEHICLES FORMED FROM SYNTHETIC RESIN

This is a continuation of application Ser. No. 236,495 filed Feb. 20, 1981 now abandoned.

BACKGROUND OF THE INVENTION

Conventionally, the cores which are used in the construction of vehicle seats, bottoms and the backs and the partitions which are used to divide the passenger occupied space from that of luggage and/or tire space are made of metal or synthetic structures. Metal structures were used to provide strength; however, their weight and cost of manufacture are excessive. Synthetic structures were of two types, pressure-molded and blow-molded, both lighter in weight and less expensive to manufacture than metal structures, but lacking the strength of metal structures. Of the two types, blow-molding is the more desirable since it is more economical of material and because the hollow construction provides for maximum weight reduction. A hollow blow-molded structure of the kind referred to is shown in FIGS. 1, 2 and 3 and it will be seen therein comprises front, back and side walls 11, 12 and 13. To improve the strength of such hollow structures, front and/or back or both front and back walls are provided with recessed ribs 14 and 16 positioned longitudinally and transversely of the structure. As shown in FIG. 2, the ribs 14 and 16 are formed in the front wall and are attached at their apices 15 internally of the structure to the back wall. In FIG. 3, wherein the ribs are formed in both front and back walls, the apices 15 of the ribs are attached to each other within the hollow structure. The structure shown in FIGS. 1, 2 and 3 are of improved stiffness over that of a structure lacking such ribs; however, because of the concavity of the ribs, the latter form potential zones of bending parallel to their length such that when the bending stresses reach a predetermined level, the structure tends to flex at the apices of the ribs. Further, the concave ribs present an undesirable surface effacement which, preferably, should be totally planar.

SUMMARY OF THE INVENTION

It is therefore an object of the present invention to provide core members and partition plates of a synthetic resin of novel construction wherein the core member or partition member is a hollow structure reinforced internally to provide the desired strength with a planar external surface devoid of the recessed ribs of the prior art as described above.

It is a further object of the present invention to provide method for producing core members and a partition plates formed of a synthetic resin, wherein the method comprises the steps of blow molding a parison of synthetic resin so s to form a hollow structure comprised of spaced, parallel, planar panels and a peripheral side wall interiorly of which there are integrally formed reinforcing members integrally joining the panel members and positioned longitudinally and transversely thereof.

The structure of the core member of partition member is formed by blow molding of a parison of synthetic resin to form a hollow structure and reinforcing members in the form of ribs concurrently so that the reinforcing ribs are molded integrally to the inside surfaces of the panel members during the blow molding operation. Desirably, the core and partition members are of a cross section to withstand surface pressures applied externally thereof without buckling and to provide internal reinforcing ribs which will withstand tension.

DETAILED DESCRIPTION OF THE INVENTION

In the following the present invention will be described in detail with reference to FIG. 4 through 13.

Figure 4:
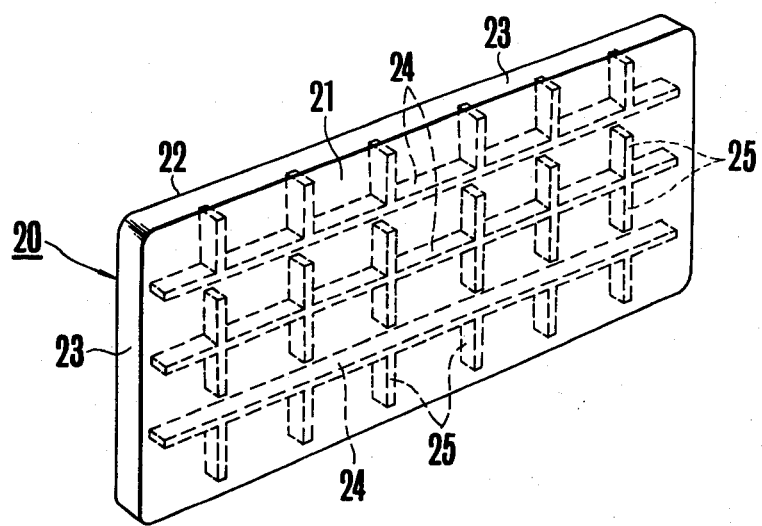
FIG. 4 is a perspective view of a back seat made according to this invention with the interior thereof shown by the dashed lines.
Figure 5:
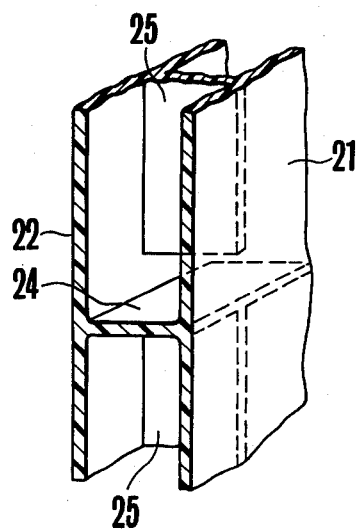
FIG. 5 is a fragmentary sectional perspective view of a portion of the core member shown in FIG. 4 showing the bonded state between the core member body and the reinforcing ribs.

Referring to FIGS. 4 and 5, there is shown a core member 20 of the bench type for the back seat of a vehicle in the form of a hollow structure provided with spaced, parallel, planar panels 21, 22, a peripheral wall 23 and internally thereof reinforcing ribs 24 and 25 positioned longitudinally and transversely within the structure and intergrally joined to the inside surfaces of the spaced, parallel panels 21 and 22.

The reinforcing ribs 24 and 25 are formed during the blow molding operation and comprise a part of the parison of molten synthetic resins of which the core is formed and support the spaced, parallel, planar panels 21 and 22 in fixed, parallel relation, thus inhibiting deformation of the exterior surface of the core and, being internal, provide reinforcement concealed within the structure so that the external surface is devoid of the depressions characteristic of reinforcement of the prior art.

Figure 14:
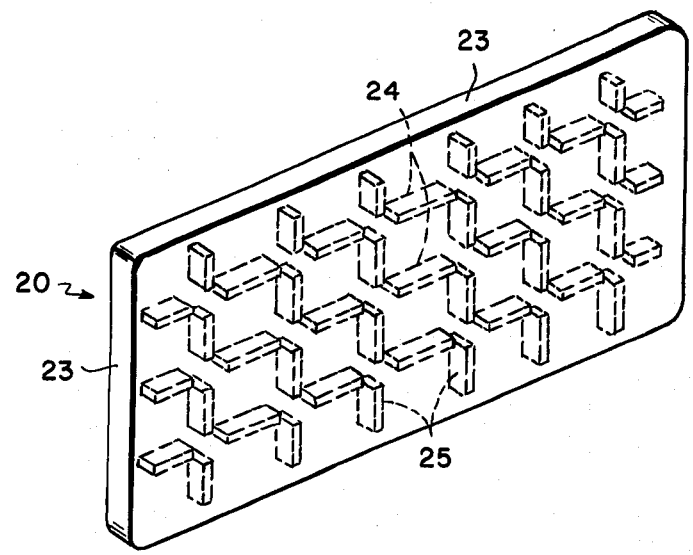
FIG. 14 is a perspective view like FIG. 4 showing the longitudinal and transverse ribs intersecting but unconnected.

In the form of the invention illustrated in FIGS. 1 to 4, the longitudinal ribs 24 are continuous from end-to-end; however, their ends terminate short of the ends of the core such that there are spaces between the ends of the ribs 24 and the peripheral wall 23. The ribs 24, however, may be longitudinally discontinuous, FIG. 14. The transverse ribs 25 are discontinuous and are connected at one end to a longitudinal rib 24 and terminate at their other end short of the adjacent longitudinal ribs and the wall 23 so that there are spaces between said other ends of the ribs 25, the ribs 24 and the wall 23. Both the longitudinal and transverse ribs 24, 25 may be discontinuous so that the opposite ends of the segments making up the transverse ribs are spaced from the opposite sides of the longitudinal ribs and the opposite ends of the segments making up the longitudinal ribs are spaced from the opposite ends of the transverse ribs.

Figure 6:
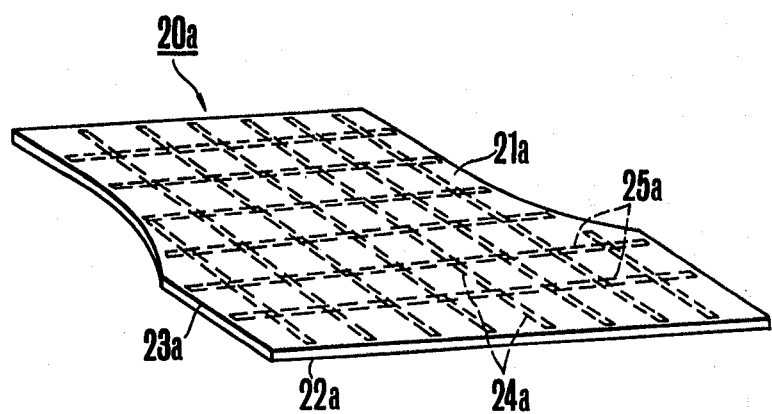
FIG. 6 is a perspective view of a partition ribs made according to this invention with the interior shown by the dashed lines.
Figure 7:
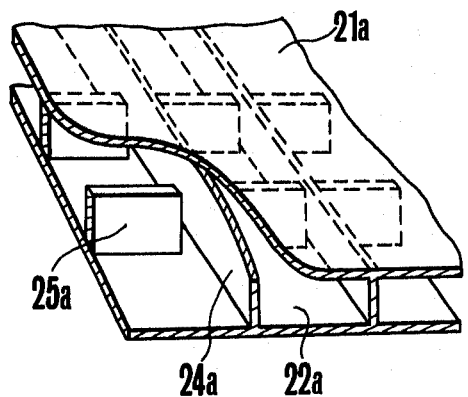
FIG. 7 is a fragmentary sectional perspective view of a partition plate made according to this invention showing the bonded state between the partition plate body and the reinforcing ribs.

A partition 20a is illustrated in FIG. 6, which is used for the luggage space, comprised of a hollow body in the form of a mat comprising spaced, parallel, planar panels 21a and 22a and a peripheral wall 23a formed integral core member 20 shown in FIG. 4, the body is internally provided with integrally formed longitudinal and lateral reinforcing ribs 24a and 25a formed integral with the inside surfaces of the top and bottom walls 21a and 22a. The ribs 24a and 25a are integral at their crossings; however, their ends are spaced from the side wall 23a.

These reinforcing ribs 24a and 25a are formed of a molten part of synthetic resin parison in a manner likementioned core member 20, the front face plate 21a and the rear face plate 21a being supported in fixed, spaced, paralleled relation by the side wall and ribs which prevent deformation of the plate surface.

Figure 1:
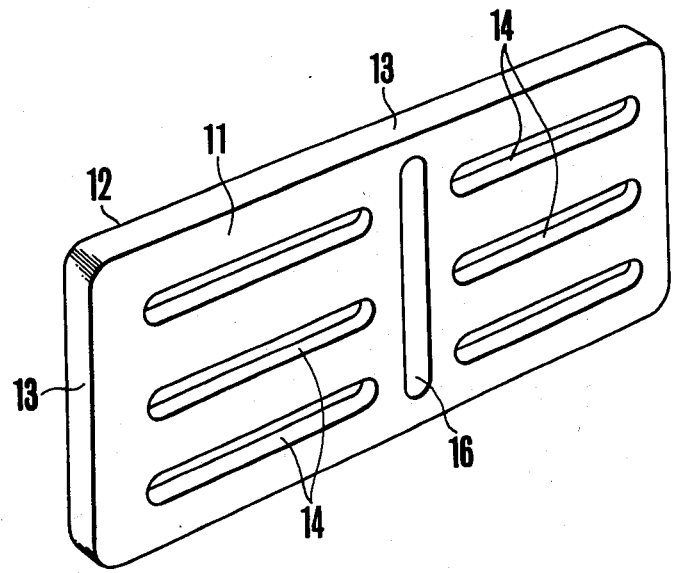
FIG. 1 is a perspective view of a conventional back seat core member.
Figure 2:
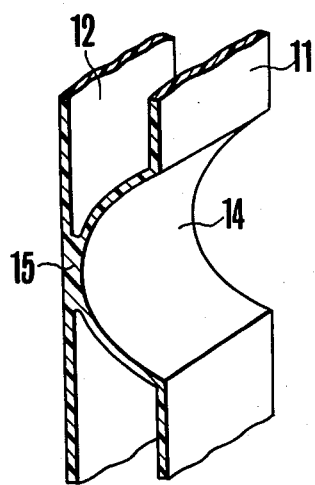
FIG. 2 is a perspective view showing, in section, a construction of a rib applied to the back seat core member.
Figure 3:
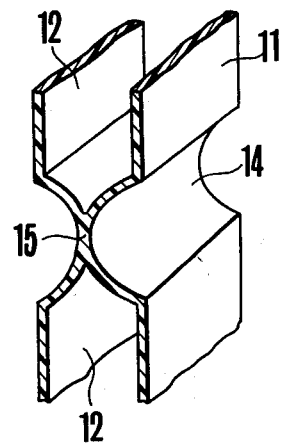
FIG. 3 is a perspective view showing, in section, another construction of a conventional rib.

The respective embodiments as mentioned above only refer to the reinforcing ribs (24) (25) or (24a) (25a), but if necessary conventionally surface indentations such as shown in FIGS. 2 and 3 may also be used together with the reinforcing ribs 24c, 25a. In this case, the ribs 14 used for reinforcement would be shorter in length than those as shown in FIG. 1. The shorter ribs 14, for example, in the shape of circular, oval, or rectangular concave surface depressions would be formed in the surfaces intermediate the reinforcing ribs (24) (25) or (24a) (25a). Such surface depressions need not necessarily be welded to each other as shown in FIGS. 2 and 3, as it may be sufficient that they merely protrude inwardly.

The partition 20a and the above-mentioned core member 20 may be manufactured by application of the blow molding means as will be described with reference to FIGS. 8 to 10 which specifically illustrate manufacturing the core member 20.

Figure 8I:
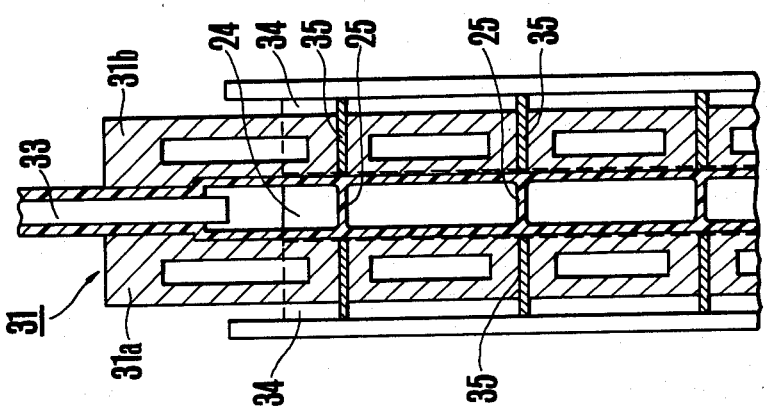
FIG. 8-I is a longitudinal sectional view showing a first stage in the formation of a core or partition according to this invention showing the state where an extruded parison within molding apparatus, FIG. 8-II is a longitudinal sectional view a second stage in the formation of a core or partition member according to this invention showing the first stage in the formation of the reinforcing plates, FIG. 8-III is a longitudinal sectional view showing the final stage of molding wherein the reinforcing rib is molded.
Figure 8:
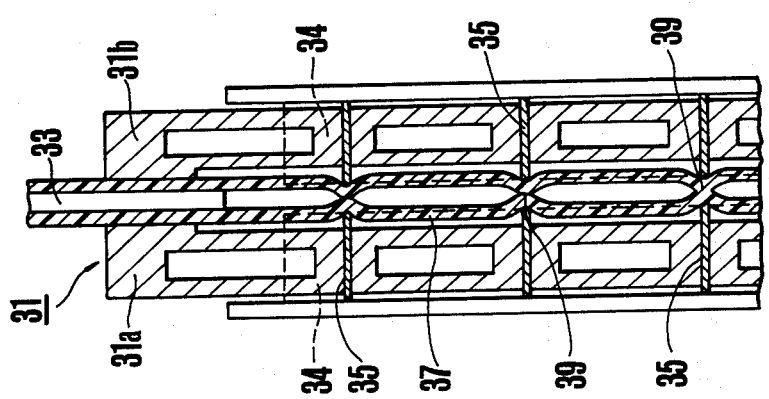

FIGS. 8-I, 8-II and 8-III sequentially illustrate the steps of manufacturing the core member 20. In the figures, reference numeral 31 designates a blow mold comprising a pair of split molds 31a and 31b, a mold members fixing plate 32, and an air nozzle 33.

The split mold parts 31a and 31b are provided with longitudinal sliding plates 34 and lateral sliding plates 35, which are disposed in a predetermined spaced relation. The plates 34, 35 are slidable inwardly into the mold cavity into abutting engagement with each other within the mold. These sliding plates 34 and 35 may be moved in and out by oil pressure, air pressure, or normal mechanical means, such as a hydraulic device 36 and are moved into the mold after the latter is closed to hold a parison and to press it partially.

First, as shown in FIG. 8-I, a molten parison 37 is extruded into the mold cavity defined by the split mold members 31a and 31b and released from an extruder (not shown). Next, as shown in FIG. 8-II, the blow mold 31 is closed to pinch off the parison 37, after which the hydraulic means 36 is actuated to push the sliding rates 34 and 35 at the opposite sides into the mold cavity to partly hold the both side walls of the parison for pressing. Alternatively, with the sliding plate 34 and/or 35 extended into the mold cavity, the blow mold 31 may be closed to pinch the parison 37.

Figure 9:
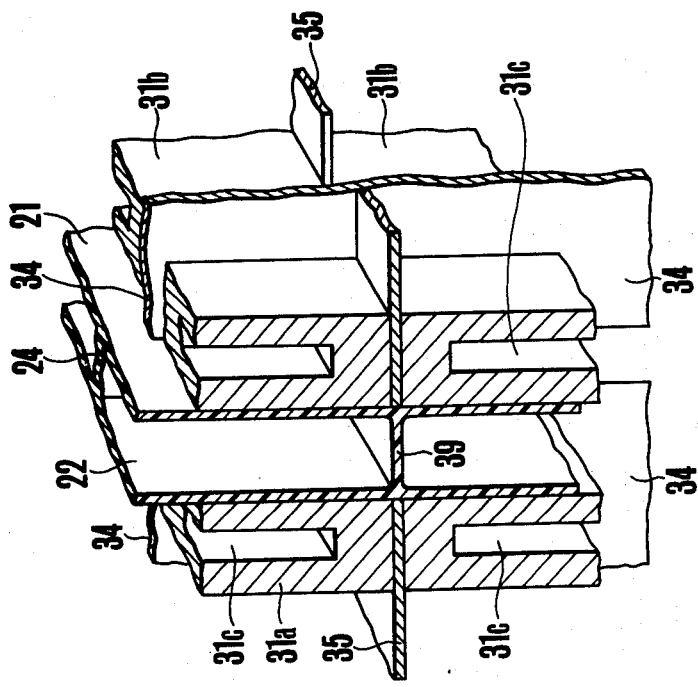
FIG. 9 is a fragmentary sectional perspective view of FIG. 8-III.

FIG. 9 shows the pressed state of the parison 37. The parison 37 is partitioned longitudinally and laterally by the sliding plates 34 and 35, and as a consequence depressions are formed in the surfaces of both side walls by the external pressure applied by the sliding plates 34 and 35 of sufficient magnitude in depth to bring the inside surfaces of the side walls into in contact with each other to form deposited portions 38 and 39.

After the parison 37 has been pressed, the sliding plates 34 and 35 are withdrawn by the hydraulic device 36 until they assume a position wherein the respective faces are flush with the surfaces of the mold and are locked by internal pressure so as not to be withdrawn, after which the parison 37 is subjected to blow molding within the mold cavity. This air pressure causes the parison 37 to be expanded fully within the cavity as shown in FIG. 8-III and as such expansion take place, the above-mentioned depression formed in the surface of the parison gradually disappears, and the deposited portions 38 and 39 are elongated into reinforcing ribs 24 and 25.

Figure 10:
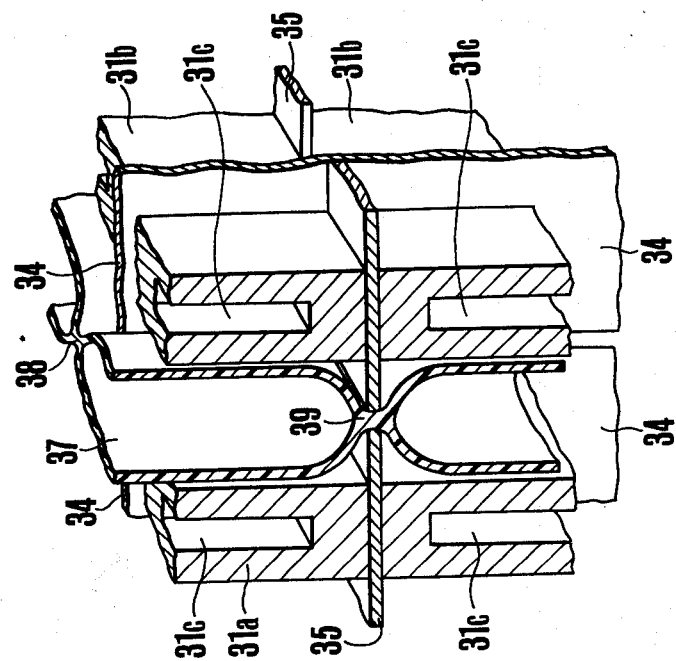
FIG. 10 is a fragmentary sectional perspective view of FIG. 8-III.

FIG. 10 shows the location of the reinforcing ribs 24 and 25. In the deposited portions 38 and 39 wherein the sliding plates 34 and 35 are withdrawn as shown in FIG. 9, the side walls in areas of the deposited portions 38 and 39 are stretched by the pressure of the air blown into the mold cavity which stretches the portions 38, 39, which are greater in wall thickness than that of the side wall portions also greater in heat holding amount, to be stretched toward the interior surface on the mold cavity until they take the form of the renforcing ribs mold 24 and 25.

Following expansion to the configuration of the cavity, the mold 31 is coold to solidify the molded product, and for this purpose, a passageway 31c is provided for cooling water. The passage 31c is positioned in the split mold so as not to interfere with the arrangement of the sliding plates 34 and 35.

In the present embodiment, while only the reinforcing rib 24 in the core member 20 in FIG. 4 is shown as being continuous, it should be appreciated that both reinforcing ribs 24 and 25 may be made continuous so as to cross without interruption.

Figure 11:
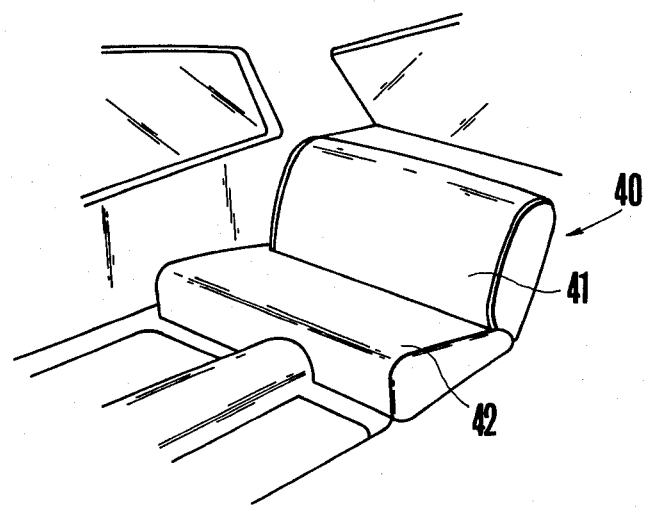
FIGS. 11 and 12 are respectively perspective views showing one example of a bench type seat and a spring type seat which can incorporate therein the core member of the invention.
Figure 12:
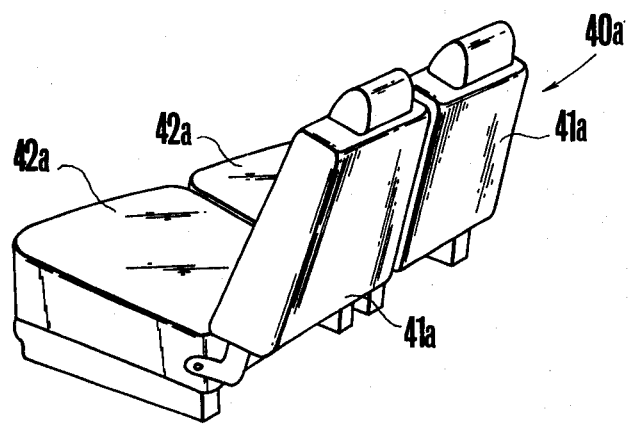

FIG. 11 shows a core member of the aforesaid construction molded in a shape for use as the back 41 or seat 42 of a bench type seat 40 or the structure can be used as the core member of a seat of the split type constructions shown in FIG. 4.

Figure 13:
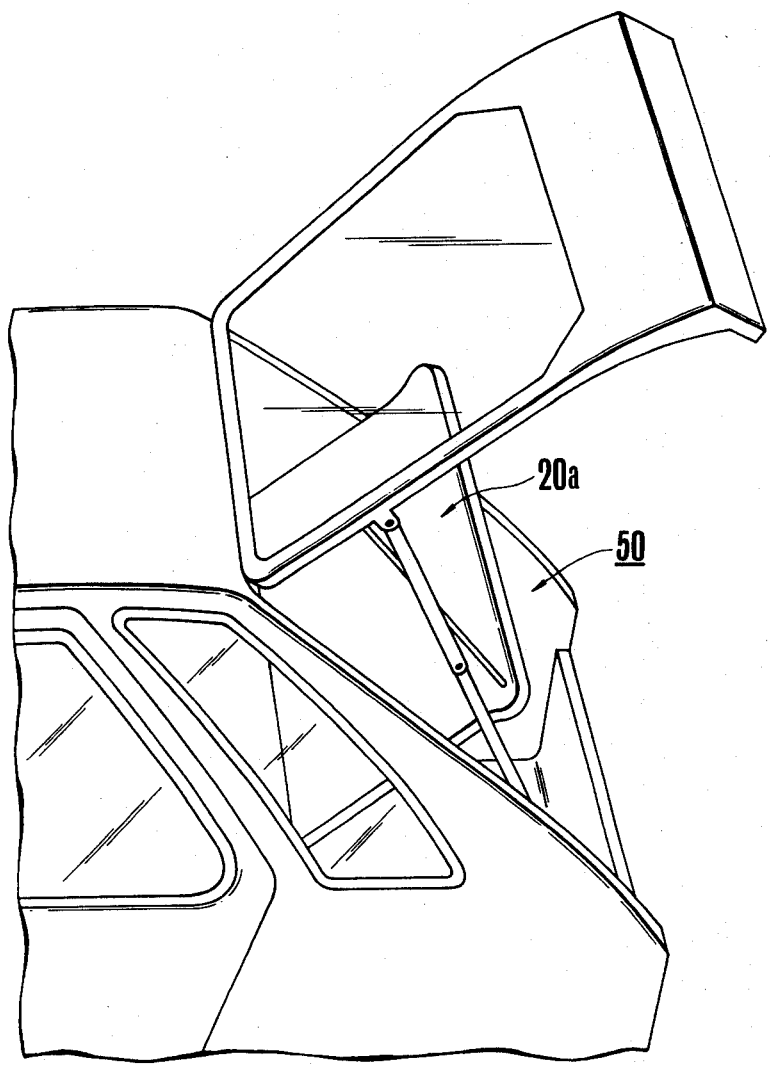
FIG. 13 is a perspective view of a rear portion of the automobile showing the state where the partition plate of the invention is used.

FIG. 13 shows a partition plate 21a made as described above employed to divide the luggage or tire space from the passenger occupied space.

It should be understood that the present disclosure is for the purpose of illustration only and includes all modifications or improvements which fall within the scope of the appended claims.

What is claimed is:

1. A structural member for automobile seat elements to which a flexible covering is to be applied comprising a hollow, seamless, blow-molded, synthetic resin core member having a pair of spaced, generally parallel panels extending over substantially all of said member and peripheral connecting wall joining them around the member, said panels and peripheral connecting wall being of uniform thickness and integrally connected, said spaced, generally parallel panels defining uninterrupted planar exterior surfaces throughout the length and breadth of the core member and said peripheral connecting wall defining an outer peripheral edge surface around the core member substantially perpendicular to the planar surfaces of the panels and reinforcing, stiffening and connecting the members interiorly of the hollow core member positioned both longitudinally and transversely thereof comprising longitudinally and transversely-disposed, spaced, parallel ribs of uniform thickness corresponding substantially in thickness to the thickness of the panels and wall positioned interiorly of the hollow core member at right angles to the spaced, generally parallel panels between said spaced, generally parallel panels and joined integrally to the spaced, generally parallel panels, said longitudinally and transversely-disposed ribs being positioned at right angles to each other, said longitudinally and transversely-extending ribs terminating short of the peripheral connecting wall so that the reinforcement of the spaced, generally parallel panels at their edges is constituted solely by the peripheral connecting wall and wherein the transverse ribs are integral at one end only with a longitudinal rib and at their other ends spaced from the adjacent longitudinal rib and from the peripheral connecting wall.

2. A structure according to claim 1 wherein the spaced, generally parallel panels are supported in uniformly-spaced, parallel relation by said ribs and wherein said ribs provide means resistant to compression and/or tension.

3. A structural member for automobile seat elements to which a flexible covering is to be applied comprising a hollow, seamless, blow-molded, synthetic resin core member having a pair of spaced, generally parallel planar panels extending over substantially all of said members and a peripheral connecting wall joining them around the member, said panels and peripheral connecting wall being of uniform thickness and integrally connected, said spaced, generally parallel panels defining uninterrupted, planar, exterior surfaces throughout the length and breadth of the core member and said peripheral connecting wall defining an outer peripheral edge surface around the core member substantially perpendicular to the planar surfaces of the panels and reinforcing, stiffening and connecting members interiorly of the hollow core member positioned both longitudinally and transversely thereof comprising longitudinally and transversely-disposed, spaced, parallel ribs of uniform thickness corresponding substantially in thickness to the thickness of the panels and peripheral connecting wall positioned interiorly of the hollow core member at right angles to the spaced, generally parallel panels between said spaced, generally parallel panels and joined integrally to the spaced, generally parallel panels, said longitudinally and transversely-disposed ribs being positioned at right angles to each other, said longitudinally and transversely-extending ribs terminating short of the peripheral connecting wall such that the reinforcement of the spaced, generally parallel panels at their edges is constituted solely by the peripheral connecting wall and wherein the ribs are continuous in one direction and discontinuous in the other direction.

4. The structure according to claim 3 wherein the spaced, generally parallel panels are supported in uniformly-spaced, parallel relation by said ribs and wherein said ribs provide means resistant to compression and/or tension.

5. A structural member for automobile seat elements to which a flexible covering is to be applied comprising a hollow, seamless, blow-molded, synthetic resin core member having a pair of spaced, generally parallel, planar panels extending over substantially all of said member and a peripheral connecting wall joining them around the member, said panels and peripheral connecting walls being integrally connected, said spaced panels define uninterrupted planar exterior surfaces throughout the length and breadth of the core member and said peripheral connecting wall defining an outer peripheral edge surface around the core member substantially perpendicular to the planar surfaces of the panels and reinforcing, stiffening and connecting members interiorly of the hollow core member positioned both longitudinally and transversely thereof comprising longitudinally and transversely-disposed, spaced, parallel ribs positioned interiorly of the hollow core member at right angles to the spaced, generally parallel panels between said spaced, generally parallel panels and joined integrally to the spaced, generally parallel panels, said longitudinally and transversely-disposed ribs being positioned at right angles to each other, said longitudinally and transversely extending ribs terminating short of the peripheral connecting wall such that the reinforcement of the spaced, generally parallel panels at their edges is constituted solely by the peripheral connecting wall and wherein both the transverse and longitudinal ribs are discontinuous such that the ends of the transverse ribs are spaced from the sides of the longitudinal ribs and the ends of the longitudinal ribs are spaced from the sides of the transverse ribs.

6. A structure according to claim 5 wherein the spaced, generally parallel panels are supported in uniformly-spaced, parallel relation by said ribs and wherein said ribs provide means resistant to compression and/or tension.

* * * * *